UNITED STATES PATENT OFFICE.

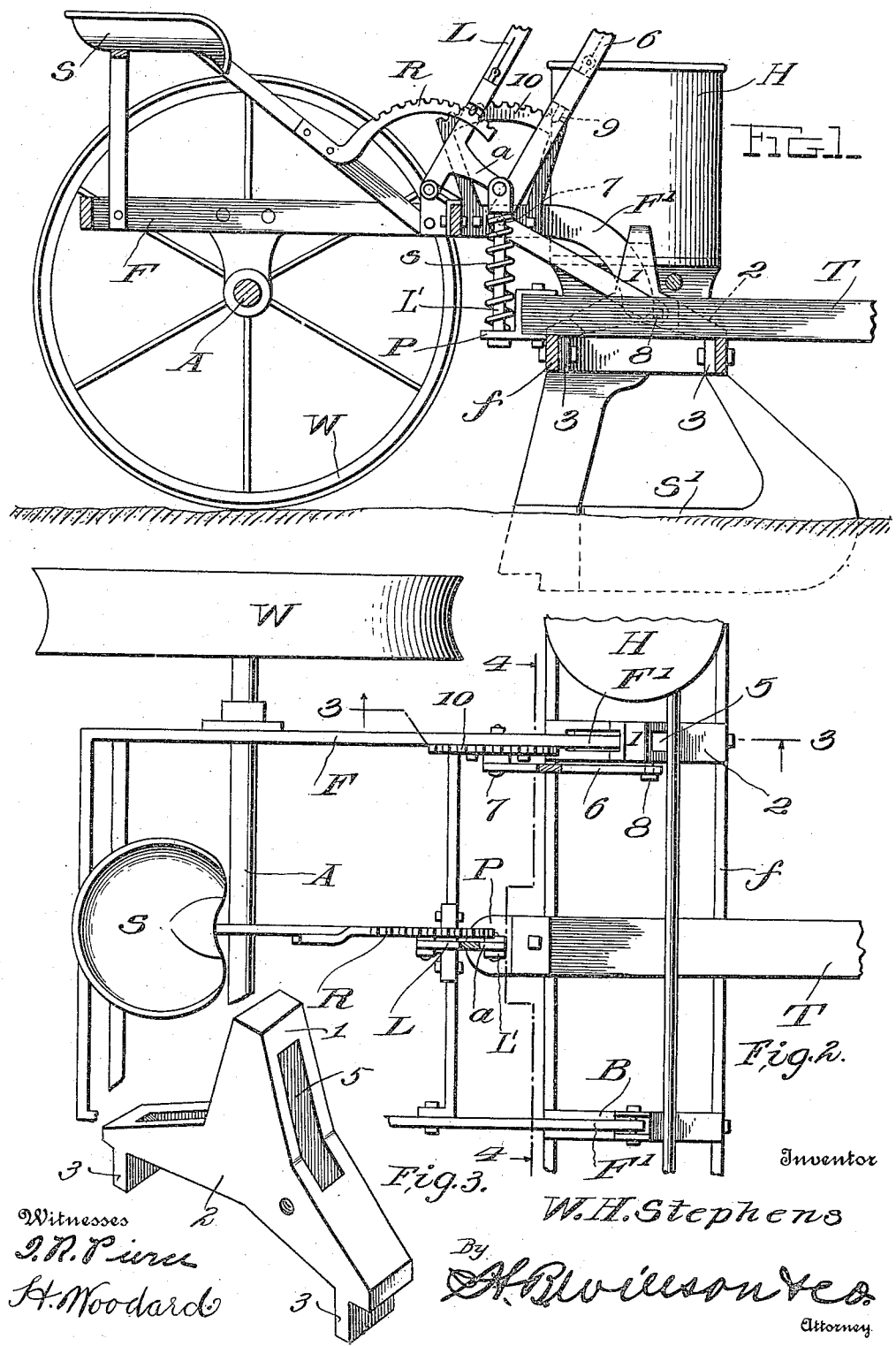

WILLIAM H. STEPHENS, OF TYRONE, IOWA.

CORN-PLANTER.

1,162,526.   Specification of Letters Patent.   Patented Nov. 30, 1915.

Application filed October 29, 1914.   Serial No. 869,272.

*To all whom it may concern:*

Be it known that I, WILLIAM H. STEPHENS, a citizen of the United States, residing at Tyrone, in the county of Monroe and State of Iowa, have invented certain new and useful Improvements in Corn-Planters; and I do declare the following to be a full, clear, and exact description of the invention, such as will enable others skilled in the art to which it appertains to make and use the same.

My invention relates broadly to improvements in corn planters and more particularly to those having vertical adjustable seed shoes.

The main object of the invention is to provide a number of simply constructed attachments which may be applied to a corn planter of ordinary construction whereby to render the opposite ends of the transverse hopper frame adjustable vertically, thereby allowing the shoes carried thereby to be forced more or less deeply into the soil.

In carrying out the above object, the invention aims to provide extremely simply constructed attachments which may be easily manufactured and readily applied to certain types of corn planters.

With the above and minor objects in view, the invention resides in certain novel features of construction and combination herein described and claimed and shown in the drawings wherein;

Figure 1 is a vertical longitudinal section through a corn planter equipped with my invention; Fig. 2 is a top plan view of the parts seen in Fig. 1; and Fig. 3 is a perspective view of the guide employed.

In the accompanying drawings, I have shown a corn planter of a well known type comprising a main supporting frame F which is substantially rectangular in plan view and whose side bars are extended forwardly and curved downwardly as seen at F'. The frame F is supported by the usual wheels W and axle A and is equipped with an appropriate seat S one of whose braces carries a segmental rack R which co-acts with a pawl on the main adjusting lever L which is pivoted to the said main frame and provided with a forwardly extending arm $a$.

Located beneath the downwardly curved forward ends F' of the side bars, is a transverse hopper and shoe supporting frame $f$, one end of said frame having a bracket B which is pivoted to the downwardly curved end of the adjacent side bar. Secured to the hopper frame $f$ by any suitable means, is the usual tongue T whose rear end is provided with a perforated plate P through which a link Z' passes, said link having a head on its lower end as is common with devices of this character and being surrounded by a coiled spring $s$ which is interposed between a shoulder on its upper end and the plate P, whereby the rear end of said tongue is allowed to yield upwardly to a slight extent as the frame $f$ is rocked by the passage of the machine over the earth.

The parts so far described, are common to devices of this character and the construction thereof forms no part of the present invention. It will be understood that by pulling rearwardly upon the lever L the main frame will be tilted around the axle A, and the frame $f$, the seed shoes S' and hoppers H thereon, will be raised sufficiently to position said shoes above the ground.

Actual experience has taught that corn planters of identically the same type above described, (with the exception that such planters are provided with two brackets B for attaching the frame $f$ to the frame F) have proved ineffective when planting on the side of a hill or when it is necessary to raise one of the seed shoes to prevent the same from contacting with a stump, rock or other obstruction. When planting on hill sides, the lower shoe is prone to travel deeply into the earth while the upper shoe often moves along the surface thereof. This is probably due to a considerable torsional movement on the part of the main frame. This is an extremely undesirable feature which is effectively overcome by the construction to be described. Furthermore, should it be necessary to raise one shoe to prevent the same from contacting with an obstruction, both shoes and the supporting frame thereof must be raised on the usual form of corn planter. By the construction to be described, however, one or both of the shoes may be raised or lowered for the purpose of overcoming obstructions or for forcing the shoes equidistantly into the ground.

As clearly shown in the various figures of the drawings, the end of the frame $f$ opposite the end carrying the bracket B, is provided with an upright guide $l$, which rises from a bracket 2 secured to said frame, the bracket 2 being here shown in the form of a yoke having depending ears 3 which are secured by bolts to said frame, while the guide $l$ is formed integrally with the bracket 2 and rises therefrom in the form of a post, said guide and a portion of the bracket being provided with an upright slot 5 which loosely receives the downturned end F' of the adjacent side bar of the frame F. By thus slidably mounting one end of the frame $f$ upon one side bar of the frame F it will be seen that the said frame $f$ may be adjusted vertically at either of its ends.

For the purpose of effecting the above mentioned adjustments, a bell crank lever 6 is pivoted at 7 to one side bar of the frame F, and at 8 to the bracket 2, the other arm of said bell crank having a pawl 9 which co-acts with a segmental rack 10 which is secured to the side bar to which said lever 6 is pivoted. By this means, the end of the frame $f$ carrying the bracket 2, may be forced downwardly by proper actuation of the lever 6, thereby causing its opposite end to move upwardly to a slight extent while, on the other hand, should the lever 6 be actuated to raise the end of the frame to which it is pivotally connected, the opposite end of said frame is forced downwardly. It will be understood that adjustment may be further made by the lever L.

From the foregoing description, taken in connection with the accompanying drawings, it will be seen that although very simple alterations have been made in a corn planter of ordinary construction, these alterations possess numerous advantageous features.

I have described my invention with considerable detail and have set forth certain specific formations for carrying out the objects of the invention, but it is to be understood that I need not be limited to details of construction other than those incorporated in the appended claim.

Having thus described my invention, what I claim is:

A hopper frame adjusting attachment for corn planters comprising a slightly arched bracket whose ends are adapted to rest on the front and rear bars of the hopper frame, a pair of ears formed integrally with and depending from said bracket member at points spaced inwardly from the ends thereof and adapted to be bolted to the aforesaid bars, the intermediate portion of said member having therein a longitudinally disposed slot opening through both its upper and lower sides and adapted to receive therein the downturned end of one side bar of the main planter frame, a post formed integrally with and rising from the intermediate portion of the bracket member, said post having an upright slot opening through its front and rear sides and registering with the aforesaid slot, and lever means having a pivotal connection with the bracket member and adapted for attachment to the aforesaid main planter frame.

In testimony whereof I have hereunto set my hand in presence of two subscribing witnesses.

WILLIAM H. STEPHENS.

Witnesses:
E. C. LAMB,
W. I. LEMASTER.

Copies of this patent may be obtained for five cents each, by addressing the "Commissioner of Patents, Washington, D. C."